United States Patent [19]
Miller et al.
[11] 3,710,319
[45] Jan. 9, 1973

[54] OPTICAL CHARACTER RECOGNITION SYSTEM

[75] Inventors: Robert Pincus Miller, Spring Valley; Abraham Badian, New City; Samuel P. Dickstein, Monsey, all of N.Y.
[73] Assignee: Scanamation Corporation, Riverside, Conn.

[22] Filed: June 5, 1970
[21] Appl. No.: 43,670

[52] U.S. Cl. ......................340/146.3 J, 340/146.3 H
[51] Int. Cl. ..............................................G06k 9/12
[58] Field of Search...................................340/146.3

[56] References Cited

UNITED STATES PATENTS

| | | | |
|---|---|---|---|
| 3,519,991 | 7/1970 | Kobayashi | 340/146.3 |
| 3,200,373 | 8/1965 | Rabinow | 340/146.3 |
| 3,496,542 | 2/1970 | Rabinow | 340/146.3 |
| 3,104,369 | 9/1963 | Rabinow et al. | 340/146.3 |
| 3,200,194 | 8/1965 | Rabinow | 340/146.3 UX |
| 3,410,991 | 11/1968 | Van Berkel | 340/146.3 X |
| 3,531,770 | 9/1970 | Mauch et al. | 340/146.3 |
| 3,506,837 | 4/1970 | Majima | 340/146.3 MA |

*Primary Examiner*—Maynard R. Wilbur
*Assistant Examiner*—Leo H. Boudreau
*Attorney*—Pennie, Edmonds, Morton, Taylor and Adams

[57] ABSTRACT

An optical character recognition system utilizes a reflecting data card including one or more fonts for the entry of one of a plurality of optically recognizable characters. The card also includes one or more non-reflecting timing marks for indicating the position of these fonts. Conventional means are used for passing these data cards at a predetermined speed past an array of one or more columns of optical comparators and a light source adapted to shine light into the cards so that it will reflect onto the array. Each comparator is adapted to produce a voltage pulse in response to a drop in the intensity of reflected light. In addition, a timing comparator is provided for detecting the timing marks and thereby triggering one or more timing pulse sources.

The outputs of the comparators and the timing pulse sources are combined in suitable logic circuitry for recognizing a character printed on the font. Specifically, one or more logical AND circuits are provided for combining the outputs of one or more comparators past which a vertical line will pass. Also applied to the AND circuit is the output of a timing pulse source adapted to pulse while light from a predetermined portion of the font is reflected onto the array. In addition, one or more logical OR circuits are provided for combining the outputs of one or more comparators past which a horizontal line printed on a font will pass. The output of each OR circuit is then combined with the output of a timing pulse source adapted to pulse while light from a predetermined portion of the font is reflected onto the comparator array. Requisite storage units are provided, and the information as to the presence or absence of line segments in the various predetermined font segments is fed into a decoder which then determines the character printed in the font.

5 Claims, 11 Drawing Figures

INVENTORS
ROBERT P. MILLER
ABRAHAM BADIAN
SAMUEL P. DICKSTEIN
BY
Pennie, Edmonds, Morton, Taylor & Adams
ATTORNEYS

INVENTORS
ROBERT P. MILLER
ABRAHAM BADIAN
SAMUEL P. DICKSTEIN

BY Pennie, Edmonds, Morton, Taylor & Adams
ATTORNEYS

INVENTORS
ROBERT P. MILLER
ABRAHAM BADIAN
SAMUEL P. DICKSTEIN

BY Pennie, Edmonds
Morton, Taylor & Adams
ATTORNEYS

INVENTORS
ROBERT P. MILLER
ABRAHAM BADIAN
SAMUEL P. DICKSTEIN
BY Pennie, Edmonds
Morton, Taylor & Adams
ATTORNEYS INVENTORS
ROBERT P. MILLER
ABRAHAM BADIAN
SAMUEL P. DICKSTEIN
BY
Pennie, Edmonds
Morton, Taylor & Adams
ATTORNEYS

FIG. 8

| CHARACTER | $S_1$ | $S_2$ | $S_3$ | $S_4$ | $S_5$ | $S_6$ | $S_7$ | |
|---|---|---|---|---|---|---|---|---|
| 1 | 1 | 1 | 0 | 0 | 0 | 0 | 0 | |
| 2 | 0 | 1 | 1 | 0 | 0 | 0 | 0 | |
| 3 | 0 | 0 | 1 | 1 | 1 | 1 | 1 | |
| 4 | 1 | 0 | 0 | 1 | 1 | 0 | 1 | |
| 5 | 1 | 0 | 0 | 1 | 0 | 1 | 1 | |
| 6 | 1 | 1 | 1 | 1 | 0 | 0 | 1 | |
| 7 | 0 | 0 | 0 | 1 | 1 | 1 | 0 | |
| 8 | 1 | 1 | 1 | 1 | 1 | 1 | 1 | |
| 9 | 1 | 0 | 0 | 1 | 1 | 1 | 1 | |
| 0 | 1 | 1 | 1 | 1 | 1 | 1 | 0 | |
| C | 1 | 1 | 1 | 0 | 0 | 1 | 0 | |
| E | 1 | 1 | 1 | 0 | 0 | 1 | 1 | |
| H | 1 | 1 | 0 | 1 | 1 | 0 | 1 | |
| L | 1 | 1 | 1 | 0 | 0 | 0 | 0 | |
| P | 1 | 1 | 0 | 0 | 1 | 1 | 1 | |
| - | 0 | 0 | 0 | 0 | 0 | 0 | 1 | |
| SPACE | 0 | 0 | 0 | 0 | 0 | 0 | 0 | |

INVENTORS
ROBERT P. MILLER
ABRAHAM BADIAN
SAMUEL P. DICKSTEIN
BY
Pennie, Edmonds
Morton, Taylor & Adams
ATTORNEYS

OPTICAL CHARACTER RECOGNITION SYSTEM

BACKGROUND OF THE INVENTION

The present invention relates to an improved optical character recognition system useful in reading stylized characters such as those printed by hand or by typewriter.

Because of the rapidly expanding scope of electronic data processing applications, conventional techniques for inputting data into computers are no longer wholly adequate. The usual input method involves the manual operation of specialized keypunching equipment by a trained keypuncher. However, this equipment is relatively immobile; and where, as in many business or industrial applications, it is desirable to record data in the field, wasteful copying may be required. In addition, in many desirable applications of electronic data processing, the personnel initially recording the data to be processed do not have the specialized training required for efficient keypunching.

One of the most promising approaches for alleviating this input problem and permitting wider use of data processing equipment involves the use of optical character recognition systems. Through the use of photoelectric sensors and logic circuitry in the variety of configurations, such systems permit a direct reading of typed or handprinted characters. Such systems, however, require rigorous control over the size and style (jointly referred to as the character font) of the characters to be recognized. Systems which are capable of recognizing a variety of different styles—such as would normally occur in hand printing—are generally very elaborate and expensive.

SUMMARY OF THE INVENTION

In accordance with the invention, an optical character recognition system utilizes a data card for the entry of one or more of a plurality of opaque optically recognizable characters. Conventional means are used for passing these data cards past an array of one or more columns of optical comparators and a light source in such a manner that the opaque characters interrupt the light path between the light source and the comparators (e.g., by preventing either reflection or transmission). Each comparator is adapted to produce a voltage pulse in response to a drop in the intensity of light reaching it. In addition, timing means are provided for indicating the position of a character on the moving card with respect to the array of comparators. Preferably, the timing means are timing pulse sources activated by the detection of an opaque timing mark or a character.

The outputs of the comparators and the timing pulse sources are combined in suitable logic circuitry for recognizing a character printed on the card. Specifically, one or more logical AND circuits are provided for combining the outputs of one or more comparators past which a vertical line of the character will pass. Also applied to the AND circuit is the output of a timing pulse source adapted to pulse while light from a predetermined portion of the character can be detected by the array. In addition, one or more logical OR circuits are provided for combining the outputs of one or more comparators past which a horizontal line printed on a font will pass. The output of each OR circuit is then combined with the output of a timing pulse source adapted to pulse while light from a predetermined portion of the character can be detected by the array. Requisite storage units are provided, and the information as to the presence or absence of line segments in the various predetermined portions of the character is fed into a decoder which then identifies the character printed in the font.

BRIEF DESCRIPTION OF THE DRAWINGS

The nature, features, and advantages of the present invention will appear more fully upon consideration of the illustrative embodiment to be described in detail in connection with the accompanying drawings. In the drawings:

FIGS. 2A, 2B, and 2C are illustrative examples of character fonts with the character "2" written in;

FIG. 8 is a tabular illustration of the binary signals produced by each of seventeen recognizable characters.

DETAILED DESCRIPTION

Figure 1:
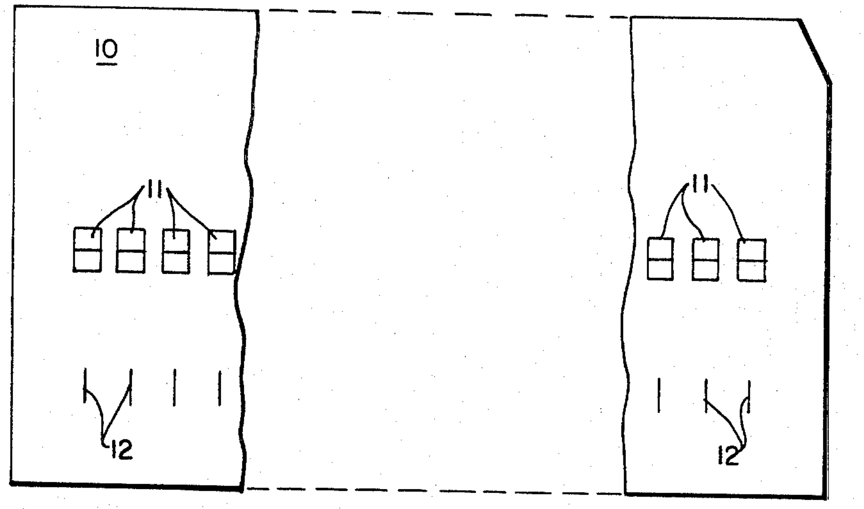
FIG. 1 is a foreshortened view of an example of a data card useful in accordance with the invention.

In reference to the drawings, FIG. 1 illustrates an example of a data card useful in the present invention comprising a reflecting data card 10—preferably having the same general size and shape as a Hollerith card. The data card includes at least one line of character font constraining marks 11 comprising lightly printed, horizontally bisected rectangular blocks onto which characters are to be printed. The areas defined by these constraining marks are hereinafter referred to as "character fonts" or "fonts. " It also includes at least one line of darkly printed reference timing marks 12 for triggering timing pulses in the character reading circuit (to be described below) by blocking the light path between a light source and a photosensitive comparator. The character fonts are lightly printed to avoid triggering character recognition comparators. Where there is sufficient control over the type of character printed, such as by the use of suitably sized type, it is possible to eliminate the character fonts. Moreover, in some embodiments the characters themselves can serve as the timing marks.

Figure 2A:
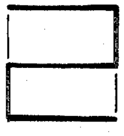
Figure 2B:
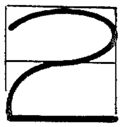
Figure 2C:
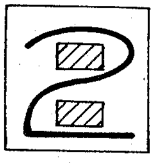

FIGS. 2A, 2B, and 2C illustrate character fonts onto which a specific character, e.g., "2" has been printed. FIG. 2A shows an ideal controlled printing where the line segments making up the character lie wholly on the font lines. FIG. 2B shows a stylized character, such as would be encountered in actual hand printing, including curved horizontal and vertical segments, and FIG. 2C shows the same stylized character on an alternative character font format which has proved particularly useful for the entry of hand printed characters. When this type of font is employed, the user is requested to print in the large open box without touching the lightly shaded internal rectangles. In an OCR system for recognizing stylized characters, it is particularly important that features of the character such as the curl at the beginning of the "2" or the curvature of vertical lines not produce spurious readings.

Figure 3:
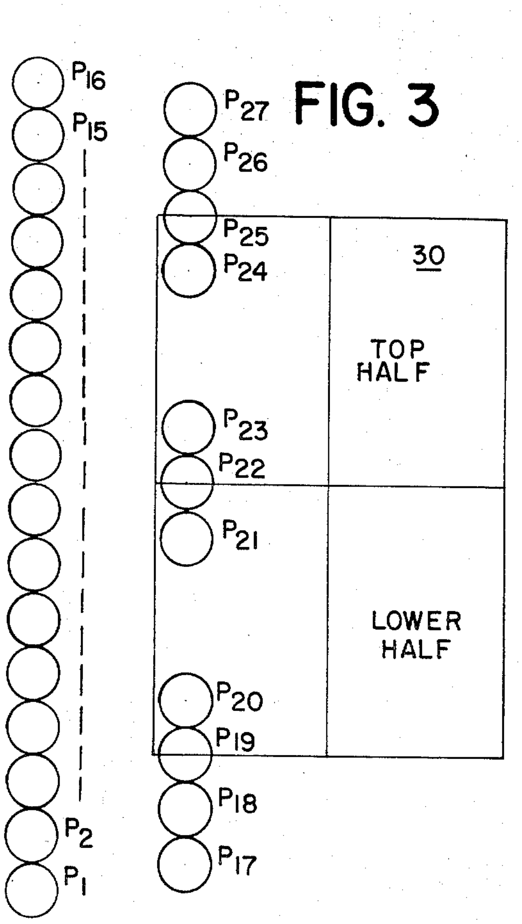
FIG. 3 is a schematic view of a character font in juxtaposition with a two-column array of photodetectors useful in character recognition in accordance with the invention.

FIG. 3 schematically illustrates a character font 30 moving into juxtaposition with a two-column array of 27 comparators, $P_1$–$P_{27}$. This array can be divided into five functional sets. Comparators $P_{10}$–$P_{12}$ are disposed to detect vertical line segments in the upper half of the character font, and $P_5$–$P_7$ are disposed to detect vertical line segments in the lower half. Comparators $P_{12}$–$P_{16}$ and $P_{24}$–$P_{27}$ are used to detect horizontal lines at the top of the font; $P_7$–$P_{10}$ and $P_{21}$–$P_{23}$ are used to detect horizontal lines at the middle; and $P_1$–$P_5$ and $P_{17}$–$P_{20}$, to detect lines at the bottom.

This array is especially adapted to recognize stylized characters. Because horizontal lines can be vertically curled, a vertical line is indicated only if all of the comparators in a set are activated. Therefore, the outputs of each of the comparators in a vertical set are combined in a logical AND circuit. (See FIG. 5.) In addition, since the vertical lines may be curved, not all of the comparators in a vertical set will necessarily be activated simultaneously. Hence, it is necessary to provide some temporary storage of vertical detection before testing for the existence of a vertical segment. A horizontal line, on the other hand, is indicated if any one of the comparators in a suitable set is activated near the center of the font. Thus, the outputs of the comparators in a horizontal set are combined in a logical OR circuit. In addition, a horizontal line may fall between two adjacent comparators in a single column and activate neither. Hence, the two columns of comparators are vertically displaced from one another (preferably by one-half the diameter of a comparator photocell) and comparators from each of the two columns are used in each horizontal line detecting set. Thus, for example, while a horizontal line at the top of font 30 passes between $P_{14}$ and $P_{15}$, it passes directly through the center of $P_{26}$ in the same group.

Figure 4:
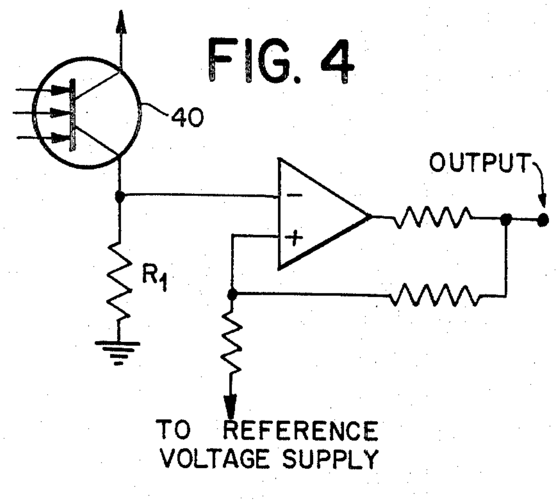
FIG. 4 is a circuit diagram of a comparator circuit useful in obtaining a voltage output from each of the photodetectors of FIG. 3 when a printed line passes between the photodetector and a light source.

Each comparator includes a photocell and an amplifier circuit for producing, in response to the reduction of reflected light due to the passage of a dark line on the font, a voltage pulse of sufficient amplitude for data processing. FIG. 4 shows one example of such a comparator in which the photocell 40 is a photo-transistor biased to maintain a current through a resistor $R_1$ when light from a light source (not shown) is not absorbed by a non-reflecting or opaque line. The resulting voltage drop across $R_1$ is used to reverse bias an amplifier 41 above a somewhat smaller reference bias. When an opaque line passes in the light path between the phototransistor and the light source, the reverse bias voltage drops below the forward trigger bias, and the amplifier emits a voltage pulse.

Figure 5A:
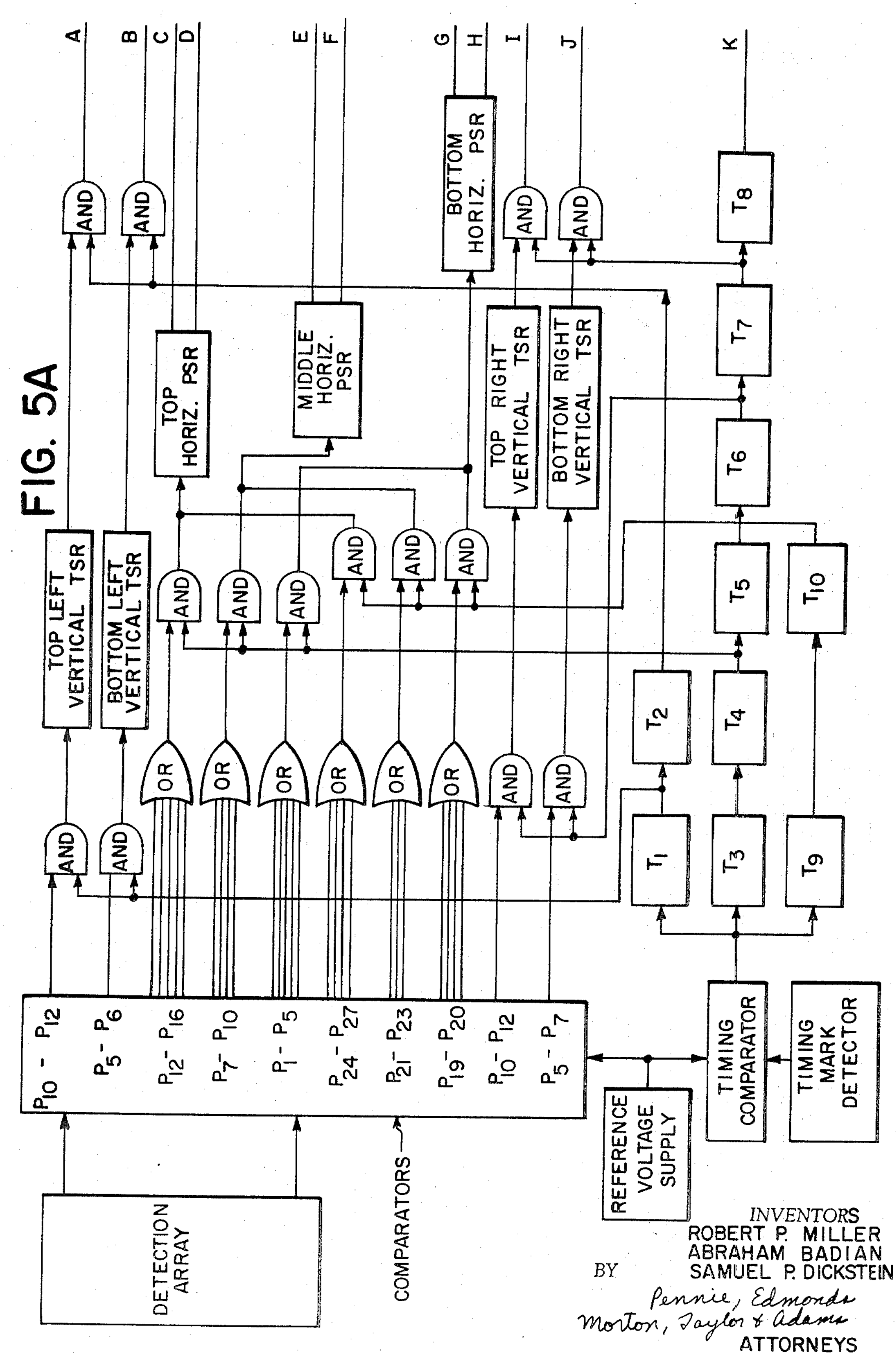
FIGS. 5A and 5B comprise a schematic circuit diagram of one example of an optical character recognition and transmission system in accoreance with the invention.
Figure 5B:
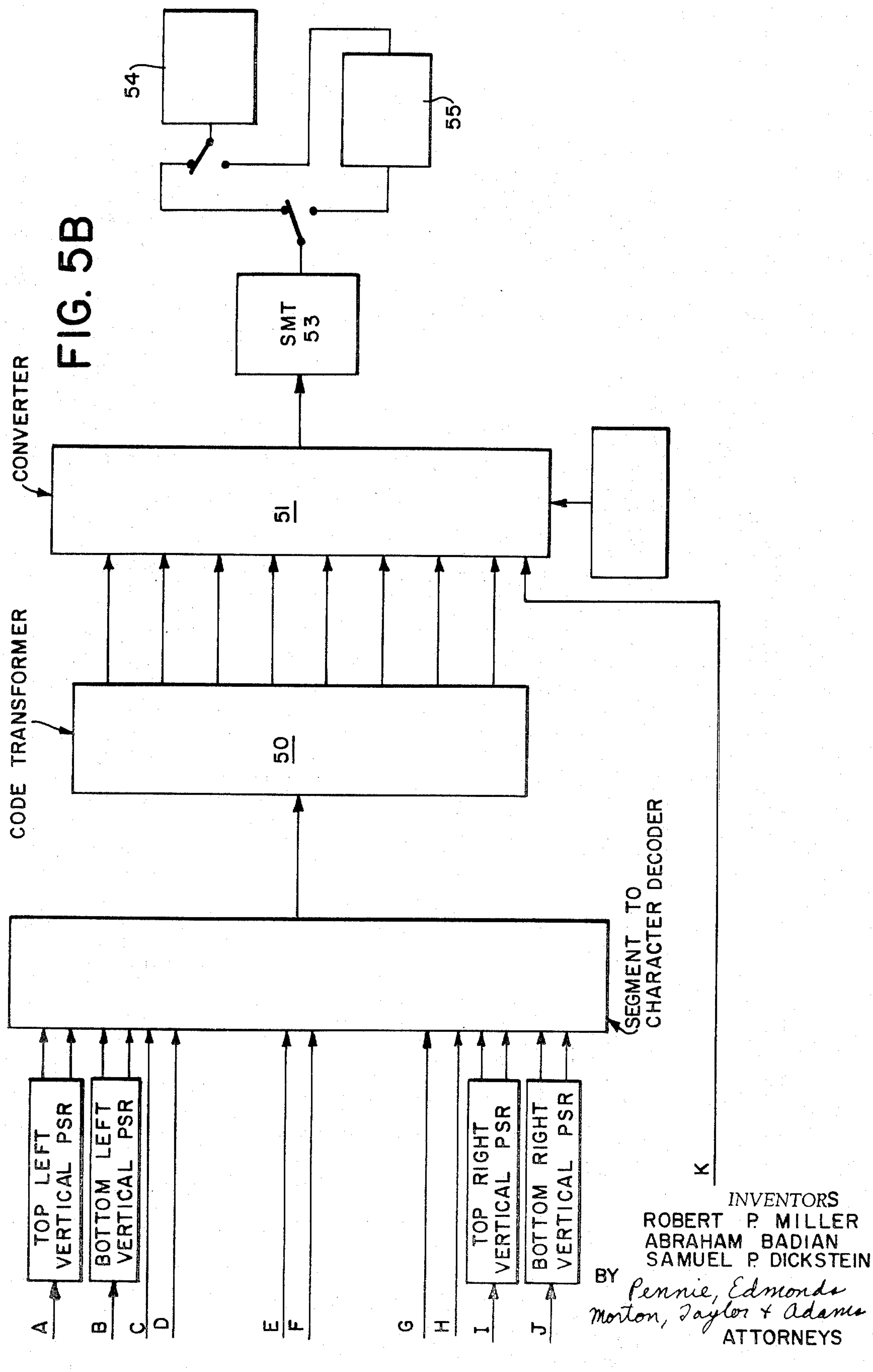

FIGS. 5A and 5B comprise a schematic circuit diagram of an optical character recognition circuit utilizing the previously described data card format and comparator array. The circuit comprises a plurality of timing pulse sources $T_1$–$T_{10}$ for synchronizing the operation of the circuitry with the motion of data cards, a plurality of OR gates for combining the output signals of the comparators in each of the horizontal line detecting sets, and a plurality of AND gates for combining the outputs of the comparators in each of the vertical line detecting sets with the vertical timing pulse sources. In addition, AND gates are used to combine the outputs of the OR gates with the horizontal timing pulse sources. Temporary storage registers (TSR'S) are provided for storing the outputs of vertical line detecting comparators for the duration of the vertical timing pulses. Various segments of the font are determined by the length of the detecting arrays, the speed of the card and the relative timing and duration of the timing pulses. Permanent storage registers (PSR'S) are provided for recording the presence or absence of vertical or horizontal lines in these segments.

As previously mentioned, a vertical line segment is detected when all of the comparators in a vertical detecting set are activated by the passage of an opaque line. Thus, vertical lines in the top left segment of the font are indicated by combining the outputs of $P_{10}$–$P_{12}$ and the output of left vertical timing source $T_1$ in an AND gate. Vertical lines in the lower left segment of the font are similarly detected by combining $P_5$–$P_7$ and $T_1$. Vertical lines on the right hand side of the font are detected by similar combinattions using right vertical timing source $T_6$.

A horizontal line segment is detected by the activation of any of the comparators in a horizontal detecting set while the center of the font passes over. Thus, a top horizontal line is indicated by an output from an OR gate combining the outputs of cells $P_{12}$–$P_{16}$ while the horizontal timing pulse source for comparators in column 1, $T_4$, is pulsing. In addition, since there are two columns having horizontal line sensing comparators, a top horizontal line is also indicated by an output from an OR gate combining the outputs of comparators $P_{24}$–$P_{26}$ while $T_{10}$, the horizontal timing pulse source for column 2, is activated. In purely circuit terms, the outputs of the OR gates and of the corresponding timing pulse sources are combined in AND gates and then serially added together. As illustrated, substantially identical arrangements are used to detect middle and bottom horizontal lines.

Figure 6:
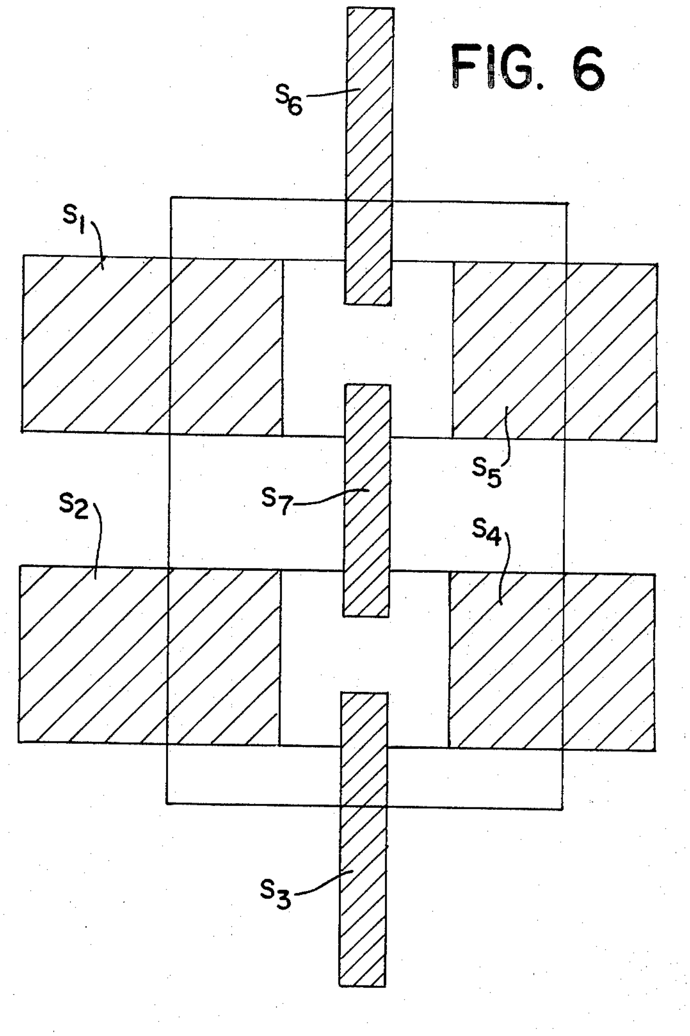
FIG. 6 is a schematic diagram showing the sections into which a character font is divided for purposes of character recognition.

An illustrative example of the segments into which a font (and adjacent regions) can be divided is shown in FIG. 6. In essence, the font is divided into seven segments illustrated by crosshatching and denoted $S_1$–$S_7$. In four of the regions $S_1$, $S_2$, $S_4$4, and $S_5$—the OCR system tests for the presence or absence of vertical lines; and in the remaining three segments, it tests for horizontal lines. The height of each segment is determined by the vertical spread of the comparators used in the search, and the length of each segment is determined by the product of the duration of the corresponding timing pulse and the speed at which the font is moved past the comparator arrays. Thus, it is readily apparent that by adjusting the pulse duration, the system can be designed to operate at different speeds and vice versa.

Figure 7:
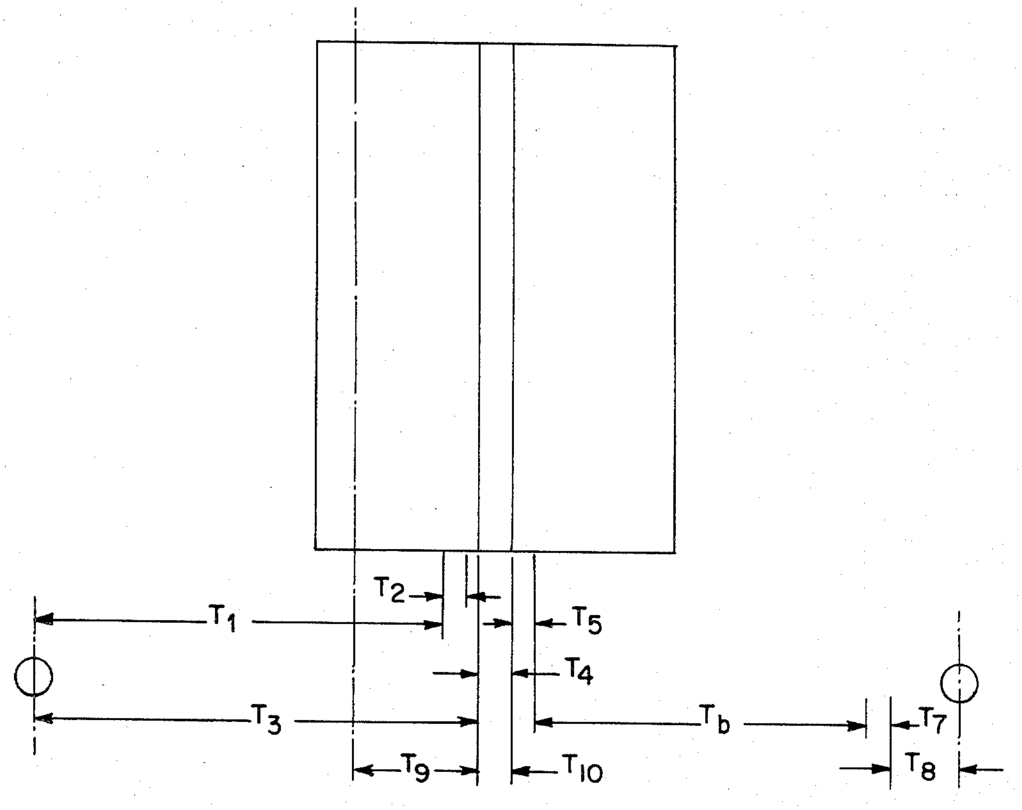
FIG. 7 is a timing diagram indicating the timing necessary to achieve the desired division of the character fonts.

FIG. 7 is a timing diagram indicating the timing and duration of the pulses necessary to achieve the font division described above. In particular, the diagram illustrates the distance which the font must be displaced during each pulse, and the positions of the pulses with respect to the columns of comparators which they are combined with. Once the speed of the font is decided, the pulse durations can be readily computed by simple division. For example, if the width of section $S_1$ and $S_2$ is to be 0.094 inch and the font speed is to be 3 inches per second, then the $T_1$ pulse width should be 0.031 second. In the preferred embodiment shown in FIG. 5, these timing pulses are obtained from a plurality of timing pulse sources (internal monostables) activated by the detection of a timing mark by a timing comparator. For convenience, groups of these timing pulse sources can be arranged to sequentially activate. For example, the falling edge of the pulse from source $T_1$ activates source $T_2$. Similarly, $T_3$ activates $T_4$, etc. In an alternative embodiment, the timing marks can be eliminated and all of the photocells connected to an OR circuit to activate the timing pulse sources. In this case, a character itself acts as a timing mark. In yet another embodiment, the internal monostables can be eliminated and a plurality of timing marks substituted in their place. In this case, the width of a timing mark determines the duration of an output pulse from one or more timing comparators. The outputs of these comparators are then applied to the AND gates in exactly the same fashion as the timing pulse sources are applied in FIG. 5. The advantage of such a system is that it can operate at varying speeds.

Referring back to FIG. 5, after the presence or absence of lines in each of the seven font segments is ascertained, this information is stored in a permanent register (a "1" indicates the presence of a line and a "0" indicates its absence). The stored information is then decoded into one of 18 recognizable characters by a segment-to-character decoder using standard AND logic techniques. A table showing the binary segment patterns corresponding to each of 17 characters recognizable by this system is illustrated in FIG. 8. While a larger number of characters can be recognized by this system, those shown can be detected with least chance of error.

For many applications, it is desirable to transmit the characters recognized to a distant receiving point. This transmission can be conveniently accomplished over standard telephone lines using the auxiliary circuitry shown in FIG. 5B. The system comprises, in essence, a code transformer 50 for converting each output character into standard character code such as ASCII parallel output code (comprising seven character bits $B_1$–$B_7$ and a parity bit $B_8$, a parallel-to-serial converter 51 including a synchronous clock 52 (preferably having a repetition rate of 110 Hz) for converting the parallel signals into serialized signals, and a serial modem transmitter (SMT) 53 for converting the serialized binary data signals into frequency shift keyed (FSK) information at frequencies suitable for transmission over the telephone lines. A READ pulse generated by timing pulse source $T_8$ of FIG. 5A can be used to synchronize clock 52 with the parallel input data; and, therefore, the parallel-to-serial converter will shift out the serial information in the correct time sequence. In a preferred embodiment, the FSK mark frequency is 1,070 Hz. With these frequencies, the output signal can be transformed into an acoustic signal by an acoustic coupler 54 and either transmitted over a standard telephone line or recorded on a tape recorder 55.

It is to be understood that the above described embodiment is illustrative of merely one of the many possible specific embodiments which can represent applications of the principles of the invention. Thus, numerous and varied other arrangements can be made by those skilled in the art without departing from the spirit and scope of the invention.

We claim:

1. An optical character recognition system comprising:

a data card including constraining marks defining areas for the entry of optically recognizable characters and including opaque timing marks for indicating the position of said constraining marks, each of said areas having predetermined left, middle and right segments;

an array of columns of optical comparators, each adapted to produce a voltage pulse in response to a predetermined drop in the intensity of light reaching the comparator;

means for passing said data card in a light path between a light source and said array of comparators at a predetermined speed;

a timing comparator for detecting said opaque timing marks and triggering at least one timing pulse source;

a plurality of logical AND circuits for combining the outputs of a first plurality of comparators, past which opaque vertical lines in said characters printed within said areas would pass, with the output of at least one timing pulse source adapted to pulse while predetermined portions of the areas defined by said constraining marks pass in the light path between said array and said light source, said plurality of comparators being divided into upper and lower groups to permit separate detection of upper and lower vertical lines in said characters and said timing pulses being chosen and timed to permit separate detection of said upper and lower vertical lines in the left and right segments of the areas defined by said constraining marks;

a plurality of logical OR circuits for combining the outputs of a second plurality of comparators, past which horizontal lines in said characters printed within said areas would pass, and a plurality of AND circuits for combining the outputs of each of said OR circuits with the output of a corresponding timing pulse source adapted to pulse while predetermined portions of the areas defined by said constraining marks pass in the light path between said array and said light source, said plurality of comparators being divided into upper, middle and lower groups to permit separate detection of upper, middle and lower horizontal lines in said characters and said timing pulse being chosen and timed to permit detection of said upper, middle and lower horizontal lines in the middle segments of the areas defined by said constraining marks; and a decoder for determining from signals from said AND circuits each of the characters printed in the areas defined by said constraining marks.

2. A system according to claim 1 including temporary storage registers for storing the outputs of the comparators for detecting left and right vertical lines in each of said characters until said predetermined left and right segments, respectively, of each of said areas have passed through the light path between said light source and said comparators.

3. A system according to claim 1 wherein said array comprises two parallel columns of comparators and wherein said columns are displaced with respect to one another to prevent a horizontal line from falling between comparators.

4. A system according to claim 1 including:

a code transformer for converting the characters recognized into standard parallel output code;

means for converting these signals from parallel to serial form; and means for transforming these signals into acoustical signals suitable for electrical transmission over standard telephone lines.

5. A system according to claim 1 wherein:

said data cards are adapted to reflect light; and said means for passing said data card in a light path between a light source and an array of comparators is adapted to pass the data card through a position where light shining from the light source onto the card is reflected onto said array of comparators.

* * * * *